United States Patent Office 3,256,478
Patented June 14, 1966

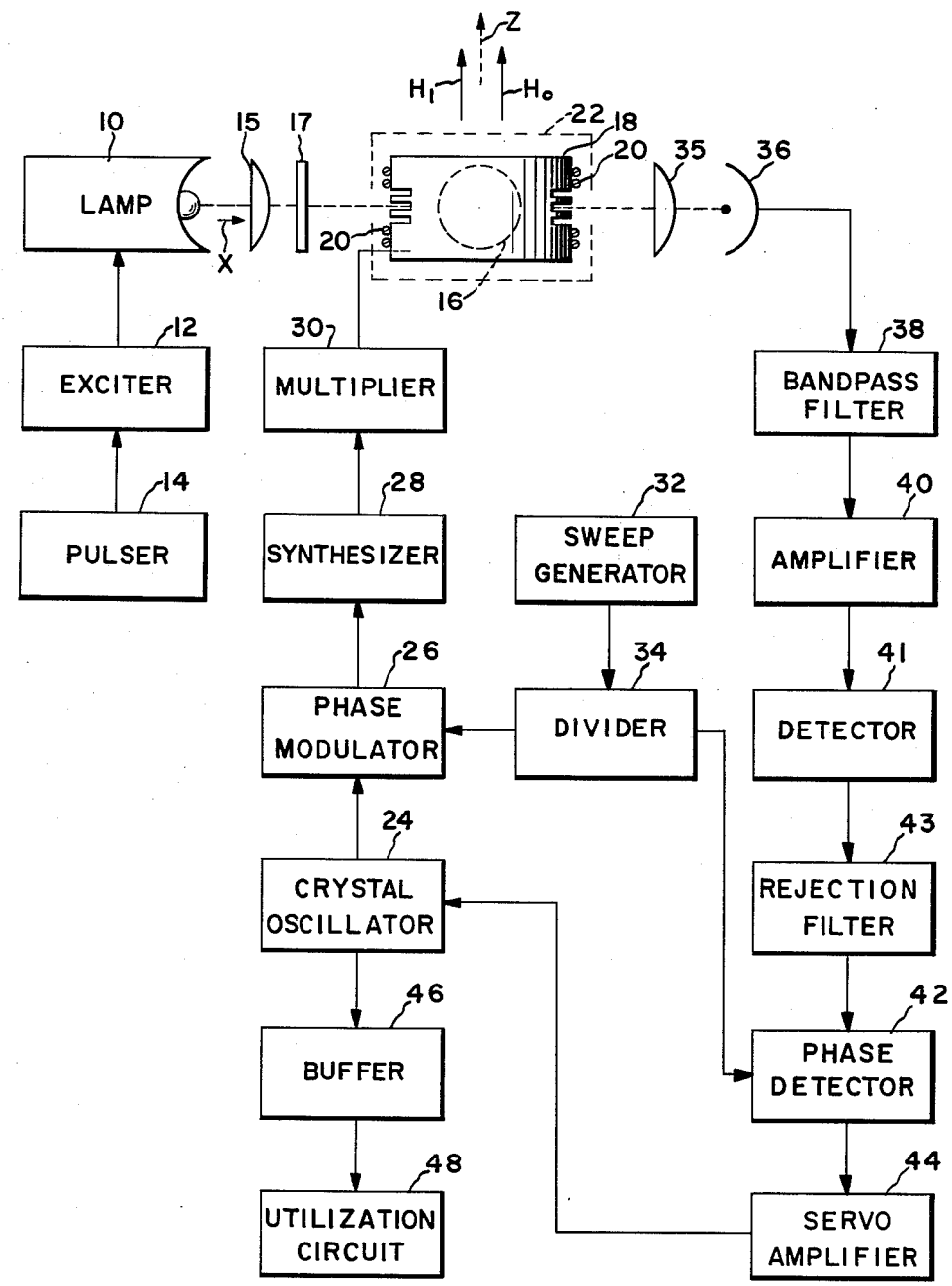

3,256,478
OPTICAL PUMPING OF HYPERFINE STATES BY LIGHT PULSED AT THE ZEEMAN FREQUENCY
Hans G. Dehmelt, Seattle, Wash., assignor to Varian Associates, Palo Alto, Calif., a corporation of California
Filed Dec. 26, 1963, Ser. No. 333,611
11 Claims. (Cl. 324—.5)

The invention relates to optical pumping and in particular to a novel method and means of optically pumping to produce a desired polarization of precessing atomic particles.

In U.S. patent applications Serial No. 95,581, filed March 14, 1961, now U.S. Patent 3,173,082 and Serial No. 129,873, filed August 7, 1961, now U.S. Patent 3,129,389, both assigned to the same assignee, there are described methods and means for optically pumped quantum systems. In the described systems, as well as in other known optical pumping systems, which are utilized as frequency standards, magnetometers, spectrometers, masers, and the like, it is necessary to employ optical filters to remove undesired lines of resonance radiation so that a single pure spectral line may be detected and monitored. Thus these systems use circular polarizers, interference filters and filter cells, among other things, as optically selective elements, which frequently may be realized only with difficulty or not at all which further may be the cause of undesirable frequency shifts of the R.F. transitions of interest.

Also conventional optical pumping systems are generally field dependent, and are subject to spurious fluctuations in existing external magnetic fields, resulting in erratic resonance line shifts. Therefore, it is necessary to provide a precise magnetic field of constant intensity and homogeneity, which requires accurate regulation.

An object of this invention is to provide a novel and improved method and means of optical pumping.

According to this invention, an assemblage of quantum systems is optically pumped by a light source that is pulsed periodically at the Zeeman frequency. The quantum systems, which are contained in an absorption cell, are positioned in a resonant cavity that is tuned to the hyperfine frequency of the atoms in the quantum system. A magnetic field of relatively low intensity having its magnetic vector substantially perpendicular to the light source beam is applied to the absorption cell. As a result, hyperfine state transitions $M_z = 0 \leftrightarrow 0$ are effected, whereby one selected field-independent hyperfine state becomes populated at the expense of another one. The hyperfine transitions provide variations in intensity of the light that emanates from the irradiated quantum systems, which may be detected and monitored in a well known manner.

For the purpose of convenience, the description that follows will be directed to the use of the invention in a frequency standard. However, the scope of this invention is also applicable to magnetometers, spectrometers, masers, and the like, and generally to any optically pumped system.

The invention will be described in greater detail with reference to the accompanying drawing in which the sole figure is a block diagram, partly in schematic, of an embodiment of this invention.

In FIG. 1, a source of radiation 10, such as a sodium spectral lamp, is pulsed on intermittently by an exciter 12, which is actuated by a pulser 14. The pulser 14 generates a periodic pulse signal at the Zeeman frequency, which in this embodiment is approximately 700 cycles per second. Each pulse is of relatively short duration, being less than the Zeeman precession period of the atoms of sodium vapor contained in an absorption cell 16.

A pulsed beam of optical resonance radiation is directed from the lamp 10 along an optical axis X through an optical lens 15 and through a circular polarizer 17 to the cell 16. The walls of the cell 16 are preferably coated with a substance, such as long-chain saturated hydrocarbon wax and/or the cell contains a suitable buffer gas, to increase the relaxation time of the atoms. The absorption cell 16 is positioned within a cavity resonator 18, which is encompassed by a coil 20 that supplies a unidirectional magnetic field $H_0$ having a vector substantially perpendicular to the optical axis X, and parallel to the Z axis defined by $H_0$. The coil 20 receives a direct current voltage from a power supply, such as a battery, (not shown), to develop the field $H_0$, while the cavity 18 and absorption cell 16 are shielded from environmental or ambient magnetic fields, such as the earth's field, by a shielding structure 22, which may be a Mu-metal housing. The unidirectional field $H_0$ may be a relatively weak field of about $10^{-3}$ gauss, for example.

The cavity resonator 18 provides an R.F. field $H_1$, substantially parallel to the static magnetic field $H_0$, and is tuned to resonate at the hyperfine frequency of sodium, that is, 1772 mc./sec. (megacycles per second), by means of a signal supply channel that includes a crystal oscillator 24. The cavity wall is slotted so as not to interfere with the microwave currents in the cavity wall, but yet to allow the light to pass through the cavity 18 orthogonally to $H_1$. The oscillator 24 provides a nominal center frequency such as 5 mc./sec., for example, which is passed through a phase modulator 26 to a synthesizer 28. The synthesizer 28 includes regenerative dividers and adders, which serve to produce a frequency that is a submultiple of the hyperfine frequency, this submultiple frequency being 177.2 mc./sec. in this case. The output frequency signal of the synthesizer 28 is multiplied by the multiplier 30 to the hyperfine frequency of 1772 mc./sec., and the multiplied output signal is coupled to the cavity 18. In those cases where the hyperfine frequency is a direct multiple or submultiple of the oscillator frequency, then a synthesizer need not be used.

Simultaneously, an oscillator or sweep generator 32 generates a sharp trigger spike signal having a frequency of about 20 cycles per second, by way of example, which is fed to a divider 34. The divider 34, which may be a bistable multivibrator or flip-flop, is triggered by the spike signal and divides the oscillator frequency to 10 cycles per second. This 10 cycle per second signal is applied to the phase modulator 26 to frequency modulate the 5 mc./sec. signal from the oscillator 24. The modulation signal is directed through the synthesizer 28 and the multiplier 30 to provide a sweep of about one line width across the peak of the resonance signal developed by the absorption cell 16.

At the output end of the cell 16 and along the optical axis Z, an optical lens 35 directs radiation that emanates from the absorption cell 16, to a photosensing device 36, such as a silicon solar cell. The cell 36 generates an electrical signal of a magnitude corresponding to the intensity of the impinging light. Variations in light intensity that result from changes in the absorption characteristics of the cell 16 are detected by the photosensing device 36. For a detailed explanation of optical transmission monitoring of atomic systems, reference is made to U.S. Patent 3,071,721, issued January 1, 1963, and U.S. Patent Applications 649,191, filed March 28, 1957, abandoned in favor of application Serial No. 350,887 filed March 10, 1964 which in turn was abandoned in favor of application Serial No. 407,422 filed October 29, 1964, and 653,180, filed April 16, 1957, now U.S. Patent 3,150,-313 all in the name of the same inventor and assigned to the same assignee.

In effect, optical pumping causes optical transitions to originate from the several energy states or Zeeman sublevels whereby the quantum systems or atoms are raised from certain optically absorbing magnetic sublevels to nonabsorbing or nonemptying levels. The pulsed light causes an azimuthal polarization, dependent on the pulse duration and relaxation time of the atoms. This results in a predominant population of the noabsorbing or nonemptying levels, such change in population designated as an alignment. By monitoring the absorption characteristic of the cell 16, it is possible to determine if an alignment in a given state has occurred, and to what extent.

In accordance with this invention, substantially all the atoms of the sodium vapor are pumped into the nonabsorbing $F=I+1/2$, initially $M_x=I+1/2$ state which then begins to precess. $I$ represents nuclear spin. Since the atoms populate the precessing $F=I+1/2$ state, the $F=I-1/2$ state will become depopulated. The exclusive population of the precessing $F=I+1/2$ state corresponds in the Z frame, when $I=3/2$, to time independent fractional population of the $|M_z|=2, 1, 0$ levels of $\frac{1}{16}$, $\frac{1}{4}$ and $\frac{3}{8}$. Since the $F=I-1/2$, $M_z=0$ state absorbs the light beam like a nonoriented state, hyperfine transitions $M_z=0 \leftrightarrow 0$ are detectable by monitoring the transmitted light intensity. This technique is applicable for $S_{1/2}-P_{1/2}$ and/or $S_{1/2}-P_{3/2}$ radiation whereby optical hyperfine or fine structure filtering is not required.

In operation, the photoelectric cell 36 generates an electrical output signal representing the intensity of light transmitted from the absorption cell 16. This output signal includes a strong signal component that varies at the lamp pulsing rate of 700 cycles per second, whether the cell 16 is at resonance or not. When the cell 16 is near resonance, the 700 cycle per second signal is modulated by the 10 cycle per second phase modulation frequency, as well as by the second harmonic or a 20 cycle per second signal component. For the condition of resonance, the 10 cycle per second fundamental signal drops out, and the 700 cycle per second signal is modulated only by the second harmonic.

This modulated signal is applied to a bandpass filter 38 that rejects noise, but passes the modulated 700 cycle per second signal. The filtered signal is amplified by an amplifier 40 and demodulated by a detector 41 that recovers the 10 cycle per second and 20 cycle per second signal components that are received from the photoelectric cell 36. These demodulated signals are fed to a rejection filter 43, which rejects the 20 cycle per second signal and passes the 10 cycle per second signal to a phase detector 42, which simultaneously receives a 10 cycle per second reference signal from the divider 34. A D.-C. error signal is developed by the phase detector 42, and the error signal is applied to a servomechanism or servo amplifier 44. The servo amplifier 44 adjusts the tuning circuit of the crystal oscillator 24 to center the nominal 5 mc. generated signal precisely. In this manner, a very accurate and stable frequency standard with a high spectral purity is realized. To utilize the stable frequency standard signal, the output from oscillator 24 is channeled through an isolation buffer 46 to a utilization circuit 48.

It is understood, that the scope of this invention is not limited to frequency standards, or to the particular combination or parameters set forth above. The inventive concept is also applicable to optically pumped magnetometers, spectrometers and masers, inter alia. Also, the values of frequencies and field strengths, among other things, are arbitrary and may vary for different applications. Furthermore, the absorption cell may contain hydrogen, potassium, rubidium, or other alkali vapors or gases in lieu of sodium, with suitable resonance radiation for optical pumping.

In addition, the inventive apparatus may employ the ground or metastable states, as long as the atomic systems are longlived in such states. Also, the pulsing of the resonance radiation from the lamp or light source may be at a frequency that is a fraction $f_z/n$, where $n$ is an integer, of the Zeeman frequency $f_z$.

What is claimed is:
1. An optically pumped apparatus comprising: a system of atoms in a magnetic field having quantized Zeeman energy states in said field and further having hyperfine energy states, and capable of undergoing resonance transitions between such hyperfine states at a hyperfine frequency, and further capable of undergoing resonance transitions between Zeeman states at a Zeeman frequency, said atoms being capable of assuming a predominant energy state population alignment in response to absorption of energy at said respectively hyperfine and Zeeman frequencies;
    means for providing resonance radiation along an optical axis to said atoms;
    means for pulsing such radiation at the Zeeman frequency of the atoms;
    means for applying a unidirectional field to said atoms, said field having a magnetic vector that is substantially perpendicular to the optical axis;
    means for applying a radio frequency field to said atoms at the hyperfine frequency of said atoms, said radio frequency field having a magnetic vector substantially parallel to the unidirectional field; and
    means for detecting the alignment of the atoms that result from the pulsed radiation and unidirectional field, and the radio frequency field at the hyperfine frequency.

2. Apparatus as in claim 1, further characterized by means for applying a modulating sweep signal to said system of atoms; and means for detecting the phase and frequency of such modulation signal.

3. Apparatus as in claim 1 whereby the pulsing means supplies pulses of Zeeman frequency that are shorter in duration than the Zeeman precession period of the atoms.

4. Apparatus as in claim 1 wherein the pulsed radiation causes the precessing $F=I+1/2$ state of the atoms to be populated at the expense of the $F=I-1/2$ state.

5. Apparatus as in claim 1 wherein said detecting means detect hyperfine transition $M_z=0 \leftrightarrow 0$ of the atoms.

6. Apparatus for optically pumping a system of atoms in a magnetic field having quantized Zeeman energy states in said field and further having hyperfine energy states, and capable of undergoing resonance transitions between such hyperfine states at a hyperfine frequency, and further capable of undergoing resonance transitions between Zeeman states at a Zeeman frequency, said atoms being capable of assuming a predominant energy state population alignment in response to absorption of energy at said respective hyperfine and Zeeman frequencies comprising: means for applying radiation along a predetermined axis to the atoms to cause transitions between energy substates; means for pulsing the radiation at a frequency that is a multiple or submultiple of the Zeeman frequency for providing a selected orientation of the atoms; means for applying a unidirectional field of low intensity to said atoms; means for applying an alternating field at the hyperfine frequency of said atoms to said atoms, said fields being substantially perpendicular to said predetermined axis; and means for detecting radiation emanating from the atoms to determine the extent of the transitions between the energy substates at the hyperfine frequency.

7. Apparatus as in claim 6, wherein the optical pumping means produces resonance of the radiating atoms, and further including means for sweeping the resonance signal with a modulation signal to monitor variations in such resonance.

8. An optically pumped apparatus comprising: a vapor cell having an assemblage of atomic systems, said cell being contained within a cavity resonator; a light source including a circular polarizer for providing an optical pumping beam to said vapor cell along an optical axis;

an exciting means including a pulser for pulsing said beam on and off intermittently at the Zeeman frequency of the atomic systems; an oscillator for generating a nominal frequency signal; means coupled to said oscillator for varying such nominal frequency signal to produce a signal having the hyperfine frequency of said atomic systems for application to said cavity resonator; means for providing a modulation sweep signal coupled to the cavity resonator; a coil encompassing said resonator for providing a unidirectional field substantially perpendicular to the optical axis; a photosensing device located to receive light transmitted from said vapor cell; a filter coupled to the output of said photosensing device for passing the modulation signal only; a phase detector coupled to the sweep signal providing means and to said filter for developing an error signal; a servo system coupled to said phase detector and to said oscillator for tuning said oscillator in response to the error signal from said phase detector; and means for utilizing the tuned signal from the oscillator.

9. An optically pumped apparatus comprising: an absorption cell having an assemblage of atomic systems, said cell being contained within a cavity resonator; a lamp for providing a beam of resonance radiation to said absorption cell along an optical axis; means for exciting said lamp to provide such radiation; means coupled to such exciting means for pulsing said beam on periodically at the Zeeman frequency of the atomic systems; a circular polarizer located between said lamp and said cell; an oscillator for generating a nominal center frequency signal; a synthesizer coupled to said oscillator for varying such nominal frequency to a desired rational frequency; a multiplier coupled to said synthesizer to provide a signal having the hyperfine frequency of said atomic systems to said cavity resonator; a sweep signal generator circuit for providing a modulation sweep signal coupled to the input circuit of said synthesizer; a coil encompassing said resonator for providing a unidirectional field substantially perpendicular to the optical axis; a photoelectric cell located to receive light transmitted from said absorption cell; a narrow band filter coupled to the output of said photoelectric cell for passing the modulation signal only; a phase detector coupler to the sweep generator circuit and to said filter for developing an error signal; a servo amplifier coupled to said phase detector and to said crystal oscillator for tuning said oscillator in response to the error signal from said phase detector; and means for utilizing the corrected nominal frequency signal from the oscillator.

10. A frequency standard utilizing optical pumping comprising: means for providing a nominal frequency signal; and assemblage of quantum systems having long-lived states; means for applying a hyperfine frequency signal to said assemblage, said hyperfine frequency signal being derived from the nominal frequency signal; means for applying a unidirectional field to said assemblage; means including a circular polarizer for directing a light beam to said assemblage, said beam being pulsed at the Zeeman frequency and substantially perpendicular to said light beam, whereby the quantum systems radiate at a resonant frequency; means for modulating such resonant frequency; means for detecting the resonance radiation at the hyperfine frequency and the modulation signal; and means for correcting the nominal frequency signal in accordance with the detected signal.

11. A frequency standard utilizing optical pumping comprising: oscillator means for providing a nominal frequency signal; an assemblage of quantum systems having long-lived energy states, cavity resonator means for applying a hyperfine frequency signal to said assemblage, said hyperfine frequency signal being derived from the nominal frequency signal; means for applying a relatively weak unidirectional field to said assemblage; means for directing a light beam to said assemblage, said beam being pulsed at the Zeeman frequency, whereby the quantum systems radiate at a resonant frequency; said unidirectional field being substantially orthogonal to the direction of said light beam; photosensing means for detecting the resonance radiation at the hyperfine frequency and the modulation signal; and means for correcting the nominal frequency signal generated by the oscillator means in accordance with the detected signal.

References Cited by the Examiner

UNITED STATES PATENTS

| 3,129,389 | 4/1964 | Packard et al. | 324—0.5 |
| 3,173,082 | 3/1965 | Bell et al. | 324—0.5 |

FOREIGN PATENTS

| 875,242 | 8/1961 | Great Britain. |

OTHER REFERENCES

Aldrich—Thesis entitled "A Helium Magnetometer That Utilizes Light Modulation," United States Naval Postgraduate School, Monterey, Calif. 1961. AEC Document NP–11366, pages 1–3, 26–29, 33–41, principally relied on.

Packard et al., IRE Transactions on Instrumentation, vol. I–11, Nos. 3 and 4, December 1962, pp. 215–223 inclusive.

CHESTER L. JUSTUS, *Primary Examiner.*

MAYNARD R. WILBUR, *Examiner.*